2,844,708
WELDING ELECTRODE ACTUATOR

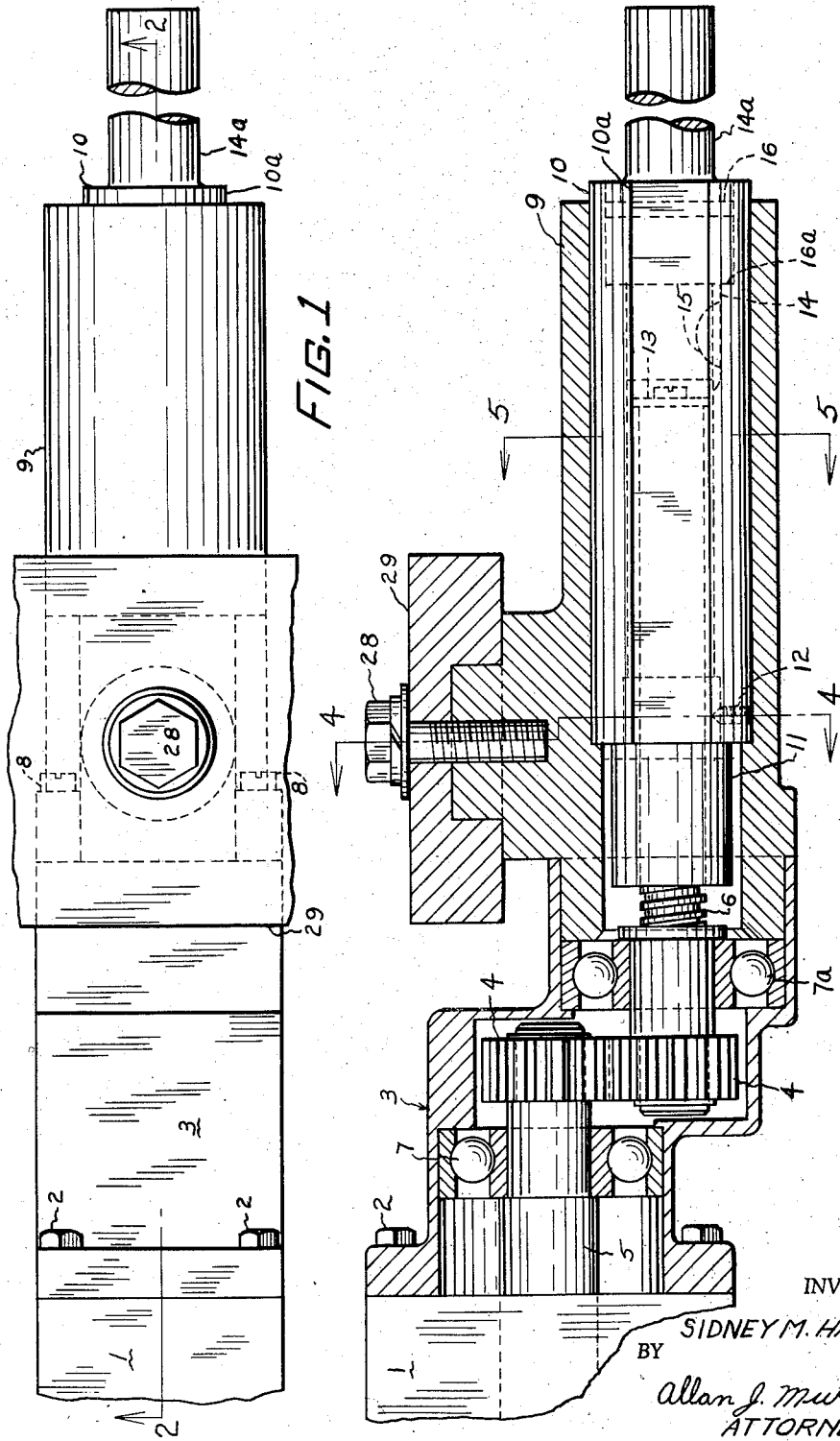

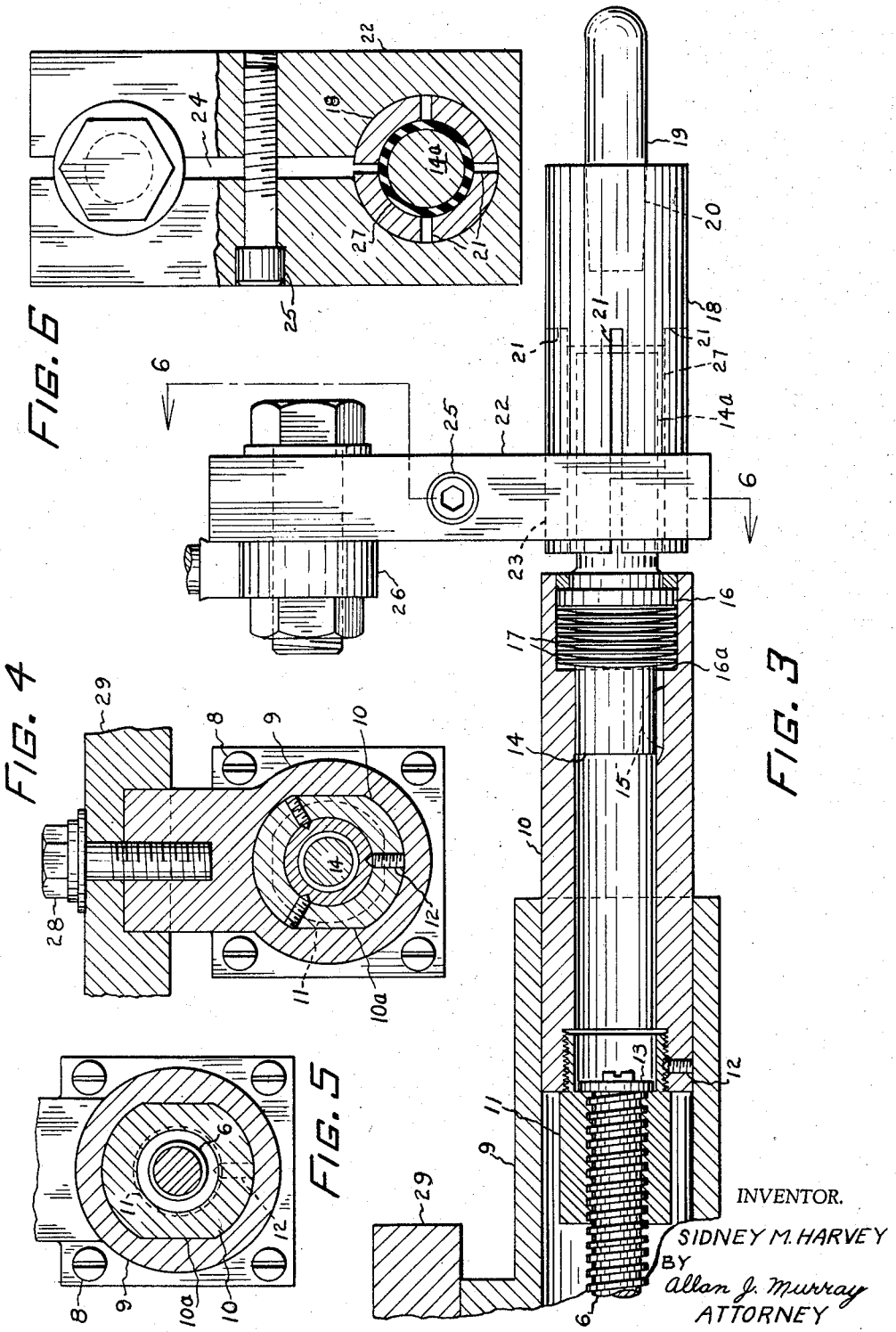

Sidney M. Harvey, Grosse Pointe, Mich.

Application March 27, 1957, Serial No. 648,900

5 Claims. (Cl. 219—86)

This invention relates to welding electrode actuators and particularly such actuators as used for spot welding.

Various machines are in common use for simultaneously producing a desired number of spot welds, such machines employing a corresponding number of electrodes and their actuators.

It is necessary for welding purposes to apply to the electrodes a considerable pressure varying from twenty to three thousand pounds, and it has heretofore been the practice to equip such machines with oil-operated piston-type actuators to effect a requisite reciprocation of the electrodes and subject the latter to an adequate welding pressure. Such machines are highly complex, requiring numerous flexible hose connections which tend to deteriorate and hence require considerable upkeep attention with consequent idle time. Oils suited to such purpose are commonly inflammable, and hence entail a fire risk.

An object of the invention is to provide an electrode actuator employing an electric motor drive, lending itself to a simplified construction and operation and largely reducing upkeep expense and fire risk.

Another object is to reciprocate an electrode and apply a requisite welding pressure thereto a mechanism employing a motor-driven rotary screw and a nut reciprocated by the screw.

Further objects are the provision of improved means for restraining the nut and electrode from rotation, and for limiting advance of the nut responsive to the screw.

These and various other objects are attained by the construction hereinafter described and illustrated in the accompanying drawings, wherein:

Fig. 1 is a top plan view of the improved actuator.

Fig. 2 is an axial sectional elevational view of the same, taken on the line 2—2 of Fig. 1.

Fig. 3 is a view of the forward portion of the actuator in vertical axial section, further showing an electrode and its connection to the actuator.

Fig. 4 is a cross sectional view taken on the line 4—4 of Fig. 2.

Fig. 5 is a cross section on the line 5—5 of Fig. 2.

Fig. 6 is a cross section on the line 6—6 of Fig. 3.

In these views, the reference character 1 designates an electric motor of a reversible type and preferably productive of about 3600 R. P. M. Rigidly secured by bolts 2 to the front end of the motor is a transmission housing 3. Within such housing is installed a pair of intermeshed gears 4, transmitting a drive from the motor shaft 5 to the rear end of a feed screw 6, said housing further receiving antifriction bearings 7 and 7a respectively journaling said shaft and screw. Forwardly extending from the housing 3 and rigidly secured to the latter by bolts 8 is an elongated hollow cylindrical guide 9 wherein said screw centrally extends. Reciprocatory in such guide is a sleeve 10 restrained from rotation by the engagement of plane lateral faces 10a thereof with matching interior faces on the guide 9. A feed nut 11 threaded on the screw 6 adjoins the rear end of the sleeve 10 and extends forwardly into such sleeve and is screw-threaded to the latter. A plurality of pins 12, spaced circumferentially on the sleeve 10 are set radially into the nut 11, assuring a permanent rigid interconnection. A disk 13 centrally and rigidly secured to the front end of the screw marginally projects slightly outward from the screw to engage the nut 11 in a forward limiting position of the latter, preventing any escape of the nut.

Slidably set into the front end portion of the sleeve is a plug 14 having a shank 14a forwardly projecting therefrom. A key 15 interconnects the sleeve and plug, preventing relative rotation thereof, while affording a desired limited sliding of the plug relative to the sleeve. Set into the inner face of the sleeve and compressed between annular shoulders 16 and 16a formed respectively on the sleeve and plug, is a set of dished resilient sheet metal rings 17 strongly resisting retraction of the plug into the sleeve. These rings exercise a spring effect, but their resistance to retraction of the plug 14 is greater than would be afforded by a coil spring.

An elongated cylindrical holder 18 for a welding electrode 19 is rigidly mounted on the shank 14a, being preferably clamped to such shank. Thus said holder has an end portion socketed at 20 to receive the shank and formed with longitudinal slits 21 affording a contraction of the holder upon the shank. A clamping member 22 has an end portion apertured at 23 to receive the slitted end of the holder 18 and is slitted as indicated at 24 from its aperture 23 to its other end, thus forming a pair of clamping arms. A clamping bolt 25 interconnects such arms to effect their clamping coaction and a consequent contraction of the aperture 23 and of the holder 18 on the shank 14a. A welding current is delivered at 26 to the member 22, flowing through the holder to the electrode. Any current flow to the shank 14a is prevented by insulation 27 disposed in the socket 20.

To support the described actuator in its position of use, it may be bolted as indicated at 28 to a bar 29, and such bar may carry any desired number of similar actuators (not shown) necessary to a desired welding operation.

In use of the described actuator, rotation of the screw 6 responsive to initial energization of the motor applies a forward feed to the nut, and such feed is transmitted to the electrode 19 through the parts 10, 14, 14a and 18. When the electrode encounters the work, the motor torque predeterminedly increases to impose the proper welding pressure on the work, the spring rings 17 yielding to allow such slight additional advance of the screw as is requisite to the increase of pressure on the work. When the proper pressure has been applied to the work, the welding circuit is closed and maintained for a requisite interval. Such circuit is then broken and the motor is reversed to retract the electrode.

While automatic controls for the motor and welding circuit may be provided, the present invention relates to the disclosed actuator regardless of any particular controls. The considerable mechanical advantage derived from employing a rotary screw to reciprocate a nut and thus advance or retract the electrode permits of employing a relatively light motor to apply a requisite considerable welding pressure to the electrode.

What I claim is:

1. An electrode actuator for spot welding, comprising a feed screw, a motor rotatively driving such screw, a nut threaded upon and reciprocable forward and back by the screw, a sleeve having its axis aligned with that of the screw, means interconnecting the nut and sleeve for reciprocation in unison, means for guiding the sleeve and restraining it from rotation, and a welding electrode holder carried and reciprocatory by said sleeve.

2. In an electrode actuator for spot welding as set forth in claim 1, means on the forward end of the screw for limiting forward travel of the nut.

3. An electrode actuator for spot welding as set forth in claim 1 said means interconnecting the nut and sleeve including a forward end portion of the nut inserted in the sleeve, and a pin radially mounted in the sleeve and inserted in the nut.

4. An electrode actuator for spot welding as set forth in claim 1, said means for guiding the sleeve and restraining it from rotation being an elongated hollow cylindrical element rigidly connected to and forwardly projecting from the motor, said sleeve being slidably fitted in said element and having a plane outer face engaging a corresponding inner face of said element.

5. In an electrode actuator for spot welding as set forth in claim 1, a plug slidably inserted in the forward end portion of the sleeve and formed at the forwardly extended axis of such plug with a shank of reduced diameter, said electrode holder having a socketed end portion to receive said shank, and means reacting between the sleeve and plug resiliently and predeterminedly opposing retraction of the plug.

References Cited in the file of this patent

UNITED STATES PATENTS

| | | |
|---|---|---|
| 452,042 | Ries | May 12, 1891 |
| 1,122,665 | Thomson | Dec. 19, 1914 |
| 1,708,769 | Mathiess | Apr. 9, 1929 |
| 2,683,206 | Day et al. | July 6, 1954 |